N. F. FRETTER.
TURRET LATHE.
APPLICATION FILED AUG. 18, 1917.
1,398,225.
Patented Nov. 29, 1921.
6 SHEETS—SHEET 1.
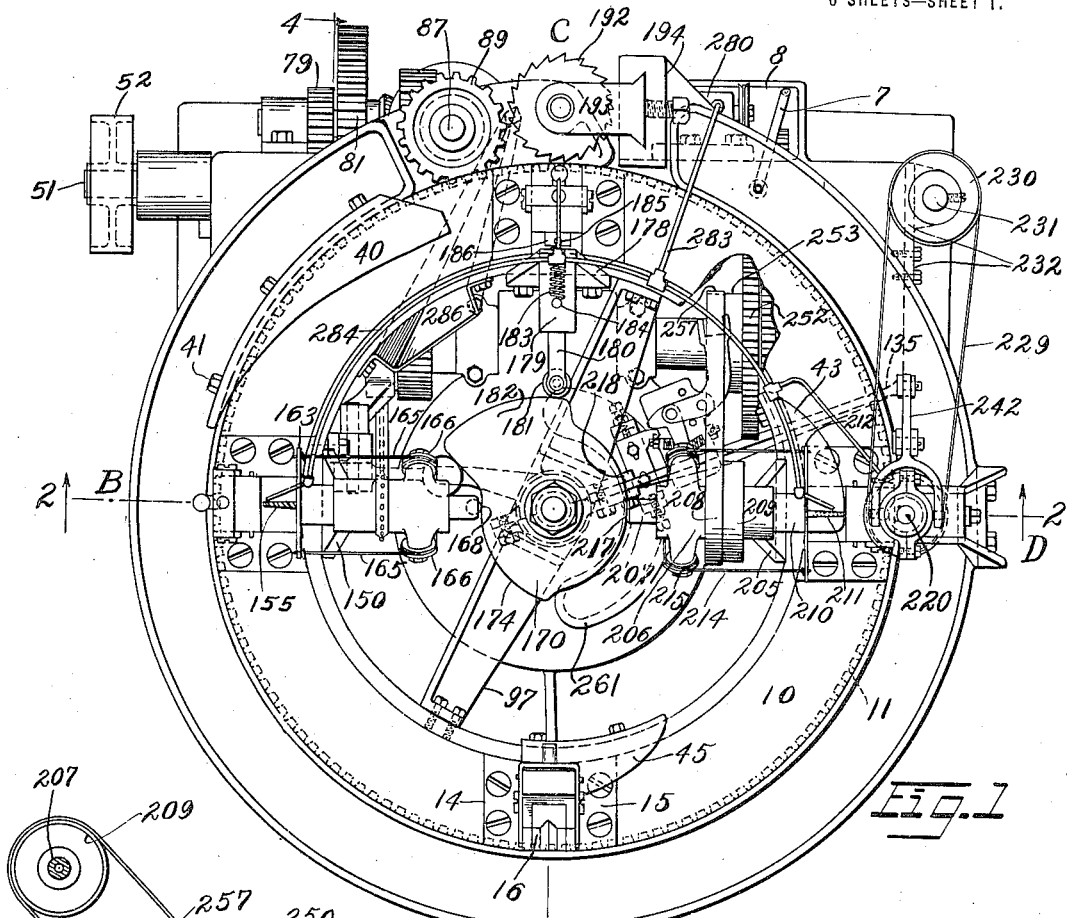
Fig. 1
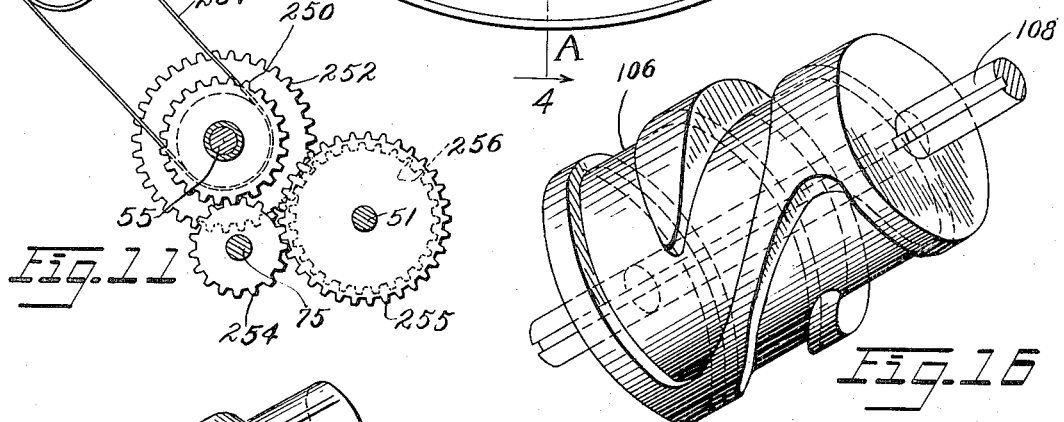
Fig. 11
Fig. 16
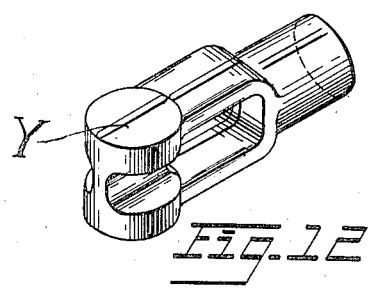
Fig. 12
Inventor-
Nathan F. Fretter,
By Hull, Smith, Brock & West
Attys.

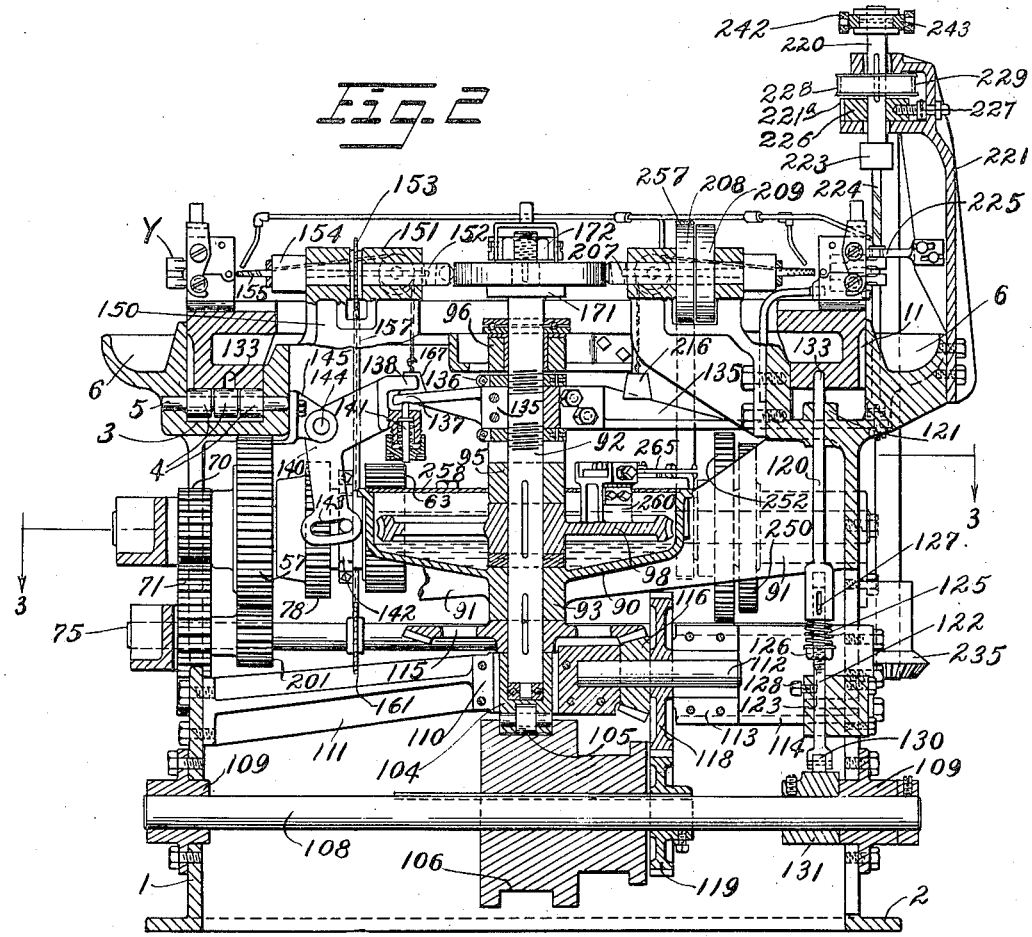

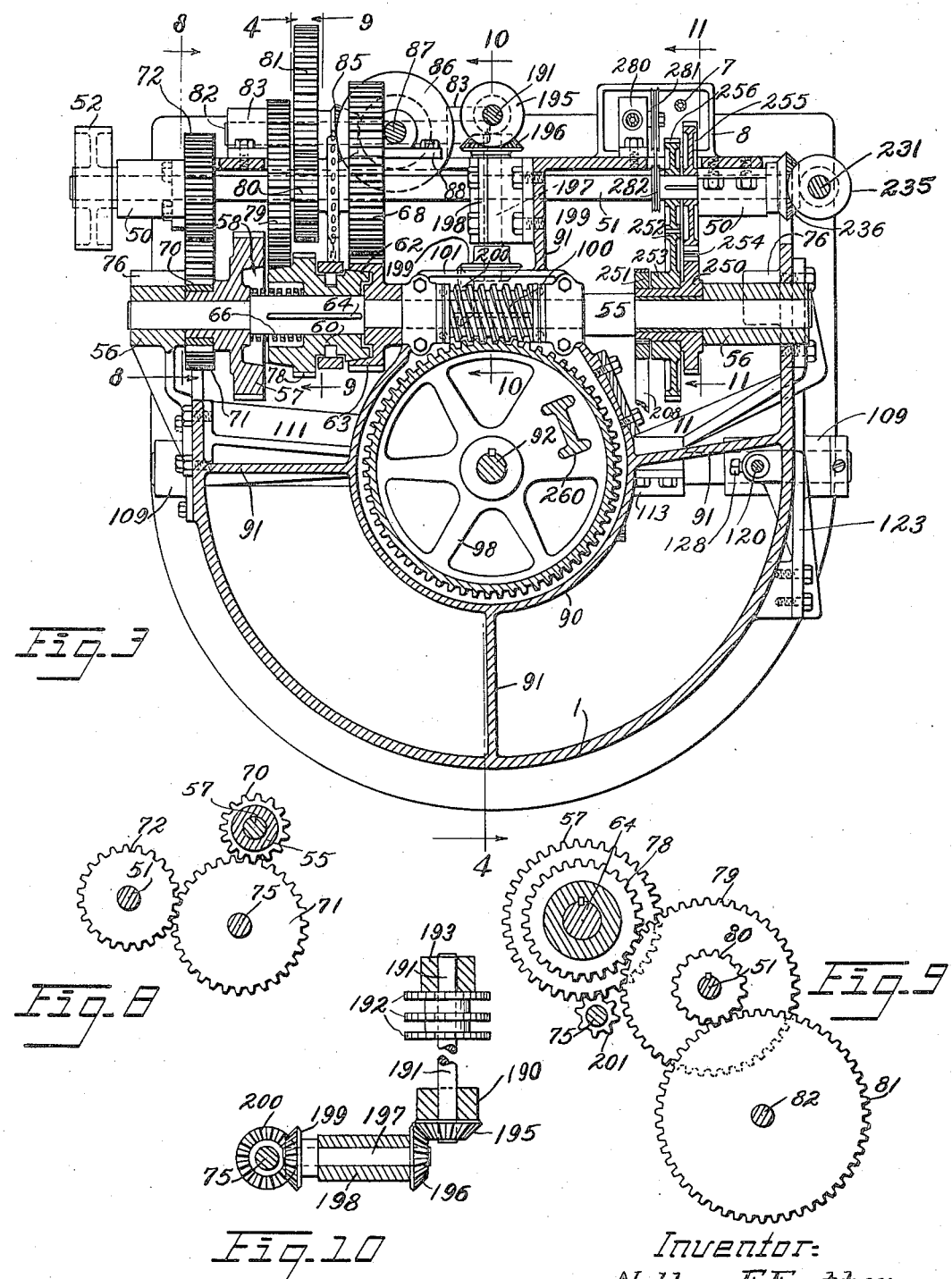

N. F. FRETTER.
TURRET LATHE.
APPLICATION FILED AUG. 18, 1917.
1,398,225.
Patented Nov. 29, 1921.
6 SHEETS—SHEET 4.
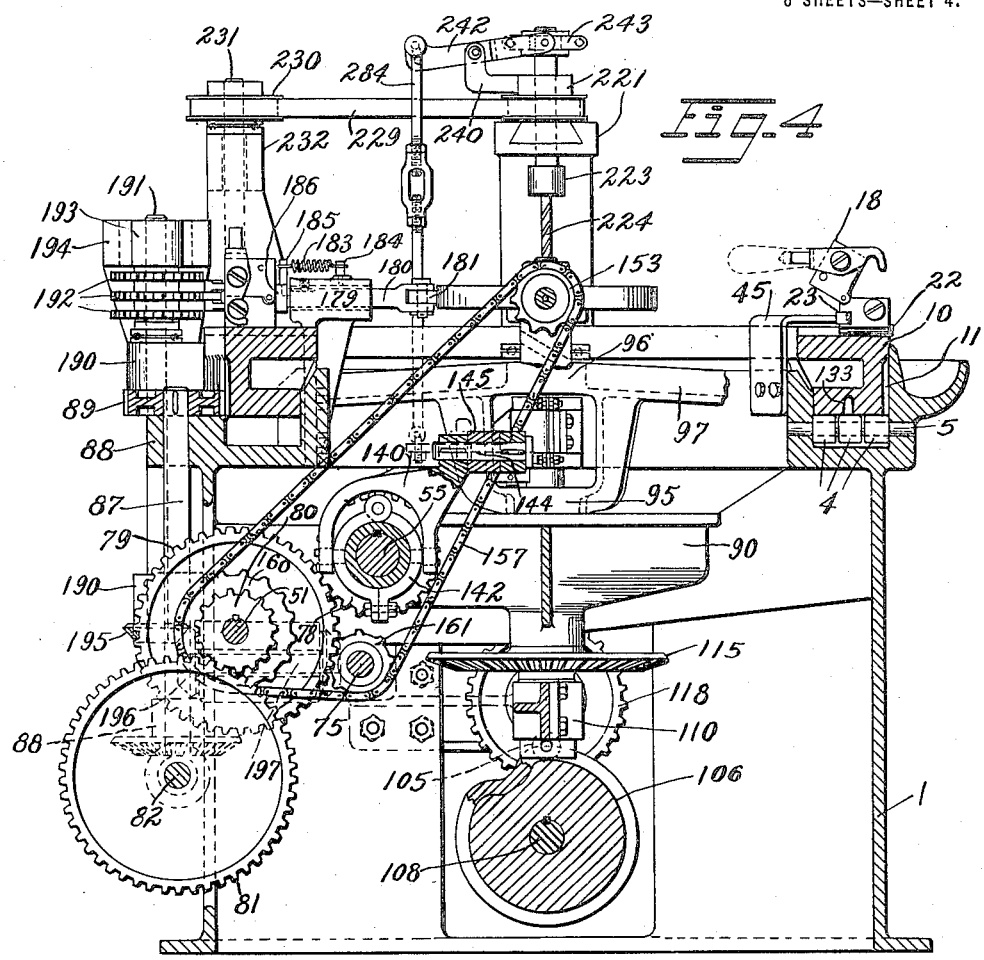
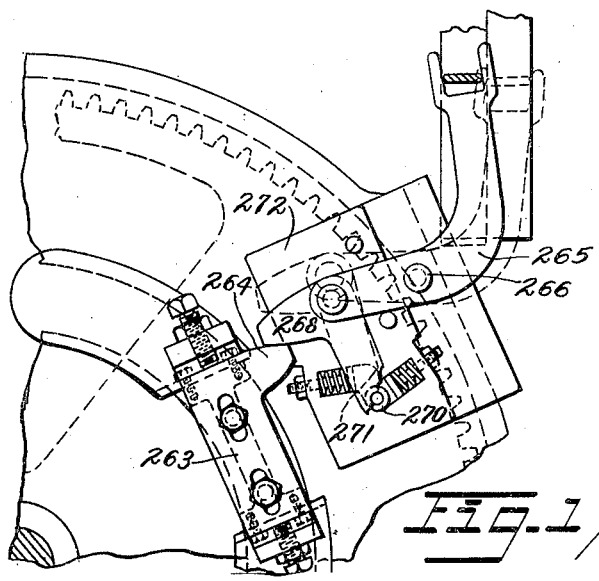
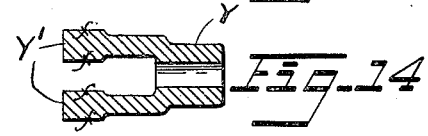
Inventor:
Nathan F. Fretter,
By Hull, Smith, Brock & West.
Attys.

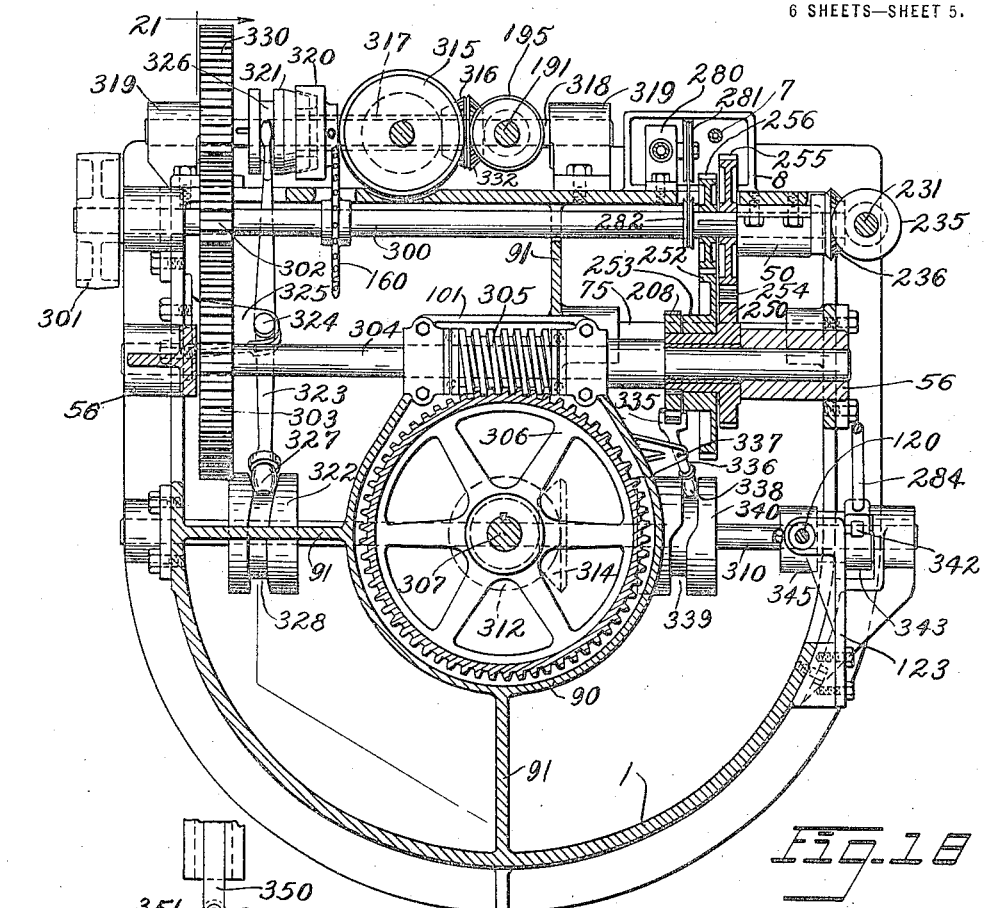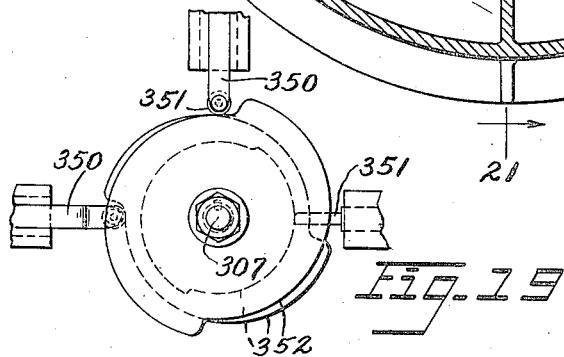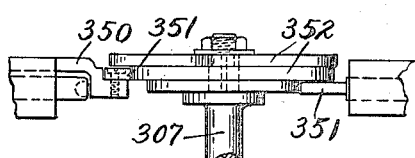

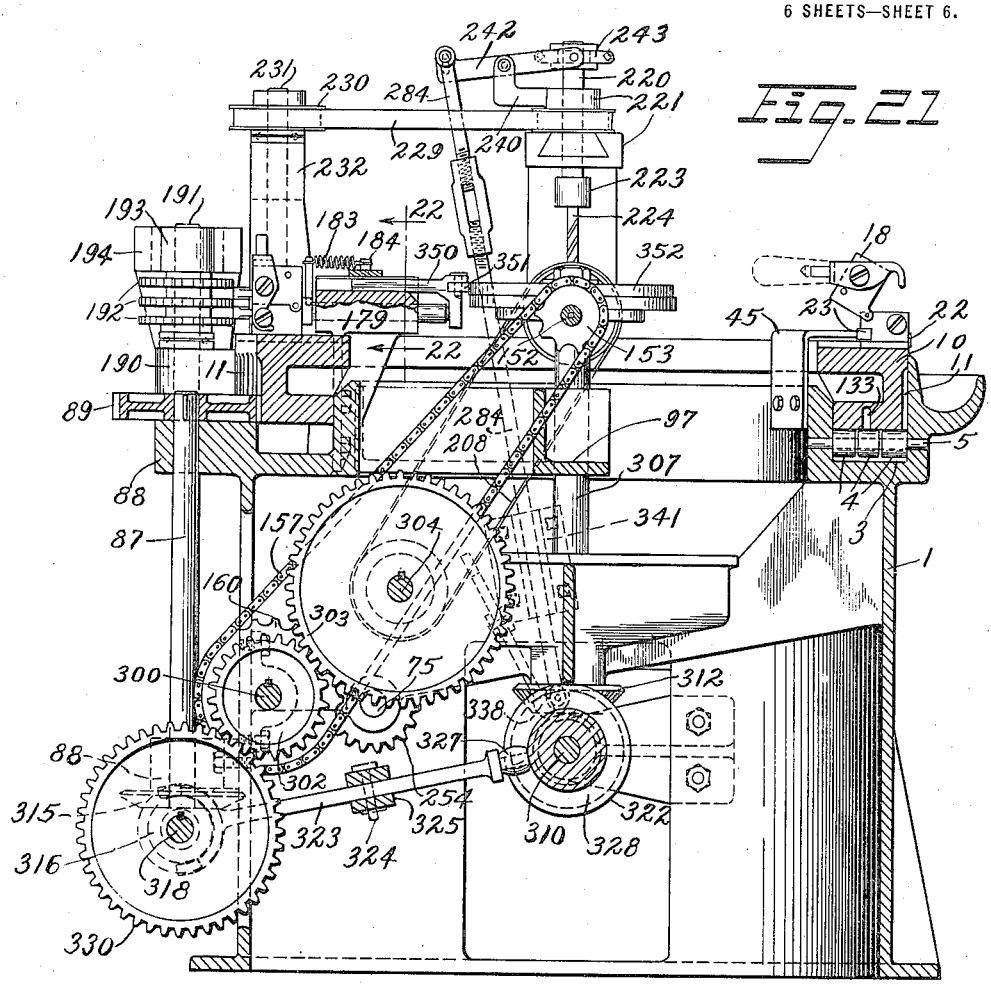
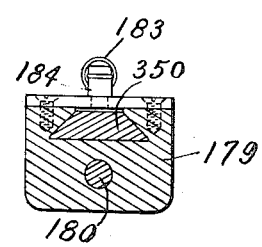

UNITED STATES PATENT OFFICE.

NATHAN F. FRETTER, OF CLEVELAND, OHIO.

TURRET-LATHE.

1,398,225.      Specification of Letters Patent.      Patented Nov. 29, 1921.

Application filed August 18, 1917. Serial No. 186,859.

*To all whom it may concern:*

Be it known that I, NATHAN F. FRETTER, a citizen of the United States, residing at Cleveland, in the county of Cuyahoga and State of Ohio, have invented a certain new and useful Improvement in Turret-Lathes, of which the following is a full, clear, and exact description, reference being had to the accompanying drawings.

This invention relates to improvements in lathes, particularly to the class known as turret lathes and which are automatic of operation.

The present embodiment is designed to finish what are known as yoke ends, although the invention is applicable to machines for finishing various other kinds of articles, as will be readily seen from the following disclosure.

At the present time the work which I contemplate doing on my improved machine requires a number of different kinds of machines, and an attendant for each. These prevailing machines are comparatively slow of operation; occupy considerable floor space; and require the work to be handled considerably. Therefore, the general objects of my invention are to increase production, while saving labor, time, expense, and floor space.

In more limited terms, my invention has for its objects to provide a machine for automatically performing successive operations in the production of a completed article; wherein the several operations may be simultaneously performed upon various articles; which requires the attention of a single operator; which (in its present forms) involves drills, milling cutters, and a threading tap, and mechanism associated with the first for instantly withdrawing the drill at the completion of its cutting operation, mechanism associated with the second for rotating the cutters continuously, and mechanism associated with the third for driving the tap in reverse directions to successively cut the thread and retract the tap; which includes novel chucks for holding the work, movable in some instances to feed the work toward the tool, and stationary in others to hold the work in a position to be operated upon by one or more tools; and again, as more general objects, the attainment of simplicity, durability, accuracy, and economy in a machine of the above character.

In the drawings accompanying and forming part hereof; Figure 1 is a plan view of a turret lathe constructed in accordance with my invention; Fig. 2 is a vertical transverse section on line 2—2 of Fig. 1, looking in the direction of the arrows; Fig. 3 is a horizontal section on the line 3—3 of Fig. 2, looking down; Fig. 4 is a section substantially on the line 4—4 of Figs. 1 and 3; Figs. 5, 6 and 7 are details of one of the chucks or workholders; the last mentioned view being a section on line 7—7 of Fig. 5; Figs. 8 to 11 are sectional details on the respective correspondingly numbered lines of Fig. 3; Fig. 12 (Sheet 1) is a perspective view of a yoke end, the article my present machine is designed to finish; Figs. 13, 14 and 15 (Sheet 4) represent, successively, the various operations in the order in which they are performed on the yoke end by the machine; Fig. 16 is a perspective view of a drum cam employed in my machine; Fig. 17 is an enlarged detail of the belt shifter of the tapping mechanism; Fig. 18 is a sectional plan view of a simplified embodiment of the invention; Figs. 19 and 20 are a plan view and front elevation, respectively, of the actuating member incorporated in the later embodiment for creating relative movement between the tools and work holders; Fig. 21 is a vertical section on the correspondingly numbered line of Fig. 18; and Fig. 22 is a sectional detail on the line 22—22 of Fig. 21.

The housing 1 of the machine is generally cylindrical in form and has a base flange 2. At its upper end it has an upwardly opening channel 3 within the bottom of which and at suitable distances thereabout are supported rollers 4 upon pins 5 which have their ends supported within the opposite side walls of the channel. The top of the housing is open inside the channel, and shown as formed integral with the outer wall of the channel is a trough 6 which has communication, through a tube 7, with a drain basin 8, the latter being illustrated as formed integral with the rear side of the machine. While I have said that the housing is generally cylindrical in form, it is made straight at its rear side and below its top to adapt it to the mechanism located in that vicinity, and presently to be introduced.

The turret 10, which is in the form of a ring, is supported within the channel 3 upon the rollers 4 so as to rotate freely. The lower outer face of the turret is provided with gear teeth 11 which extend continuously throughout its circumference, the teeth being entirely concealed by the outer wall of the channel 3. 90° apart about the turret, its upper surface is radially grooved at 14 to receive in the sides of each groove, plates 15, and the opposed edges of these plates are formed to produce between them a dove-tail guideway within which is slidably retained the lower portion of a chuck or work holder 16.

In Figs. 5, 6 and 7, where the chucks or workholders are shown in detail, it will be observed that the same is made up of an upper block 18 and a lower block 19, which are hinged together on pins 20 a pin being located on each side of the vertical center and spaced therefrom to leave the central portion of the chuck unobstructed, the lower block having a dove-tail extension 21 for guidance within the dove-tail groove above described. A roller 22 is set within the rear of the block 19, and a roller 23 in the front face thereof. A cavity 25 is formed in the front of the blocks 18 and 19 and is divided substantially equally between the two, the cavity opening through the rear of the blocks between their hinged connections. A hardened jaw 27 is clamped within each block by screws 26, and each jaw has a recess 28. These recesses are adapted to receive the shank $y$ of a yoke Y so that the bosses $y'$ of the yoke project beyond the front of the chuck, while the end of the shank is exposed through the opening in the rear of the chuck. A fork 30 fits down over the block 18 and has its side branches pivotally connected thereto by means of the screws 31, the branches extending down over the sides of the block 19 and to receive within their notches 32 the anti-friction rollers 33, carried upon the screws 34 which project from the sides of the block.

The notches 32 are of such shape as to produce a camming action as their lower sides engage and ride beneath the rollers 33 when the upper end of the fork is swung forwardly. The movement of the fork in a reverse direction is arrested by a pin 35 which projects from the side of the block 18. Each fork has a stud 36 for the application of a handle 37 that may be applied by the operator when he wishes to open or close the chuck.

In Fig. 1 I have designated, by the letter A, the station at which the articles to be finished are inserted into and removed from the chucks. By means of mechanism presently to be described the turret is rotated intermittently through 90°, always in one direction. At the station designated B. in Fig. 1, the first step of the operation is performed, to-wit, the drilling of the shank $y$ of the yoke, such step being illustrated in Fig. 13. At C the circular faces of the bosses $y'$ are finished, such constituting the second step in the finishing operation, as illustrated in Fig. 14. At D, the bore of the shank is tapped or threaded and the bosses are bored as indicated in Fig. 15, which represents the third and final step of the finishing operation. Each chuck arrives at station B at the outer edge of the turret 10 and remains in such a position during the performance of the first step of the operation. As the chuck advances toward the station C, the roller 23 in the front face of the block 19 engages the edge of a cam 40 which shifts the chuck inward. The cam is secured by screws 41 to the side of the channel 3 and projects upward and over the turret, the depth of the cam being sufficient to move the chuck to the inner side of the turret ring. During the cutting operation, which is performed at station C, the chuck is advanced toward the outer edge of the turret by mechanism which will presently be described and into operative relation to the cutters, the movement being sufficient to project the bosses completely past the edges of the cutters. Any further outward movement of the chuck necessary to bring it to the extreme outer edge of the turret is accomplished by the cam 43 which is secured to the inner wall of the channel 3 and rises upward and overhangs the rear side of the turret, the edge of the cam being arranged to engage the roller 22 in the rear of the block 19. The chuck is held in this position by cam 43, during the operations that are performed at station D, and as the chuck arrives at station A, it is held in the same position by a similar cam 45.

Supported within bearings 50, just inside and extending along the rear wall of the housing is the main shaft 51 which is shown as carrying a pulley 52 at its left hand end (as viewed from the front of the machine). A shaft 55 is arranged parallel to shaft 51 and transversely of the machine, the same being supported at its ends in bearings 56. Near its left hand end it has loosely mounted upon it a gear 57 which has incorporated in it a conical clutch face 58, for coöperation with the adjacent end of a sliding clutch member 60, splined to the shaft 55, the keyway in the shaft being designated 64. The opposite end of this clutch member is adapted to engage a clutch face 62 formed within a gear 63 that is also loosely mounted upon the shaft 55. A spring 66, which surrounds the shaft and is interposed between the gear 57 and the adjacent end of the clutch member tends to shift the clutch member into engagement with the clutch face 62 of the gear 63. A gear 68 is keyed to the main shaft 51 and meshes with the gear 63, so that when the clutch member is in engagement with the face 62, the shaft 55 will be driven in one direction from the main shaft. A pinion 70 (see Figs. 3 and 8) is secured to a hub extension of the gear 57 and meshes with an idler gear 71, which, in turn meshes with a pinion 72 that is fastened to the main driving shaft so that, when the clutch member 60 engages the clutch face of the gear 57, the shaft 55 will be driven in a reverse direction. The idler gear 71 is carried by a shaft 75 which extends completely through the machine and is journaled in bearings 76.

When the clutch member 60 is moved in the direction of the gear 57, a gear 78, shown as a part of the clutch member, is shifted into mesh with a gear 79, loosely mounted upon the main shaft and having connected to it a pinion 80 which, in turn, meshes with a gear 81 that is fastened to a short shaft 82, journaled within bearings 83, that are secured to the rear wall of the housing. (See Figs. 3 and 9). A bevel pinion 85 fastened to the right hand end of the shaft 82, drives a bevel gear 86 that is fastened to the lower end of a vertical shaft 87, which is journaled within bearings 88 that extend from the rear side of the housing, the shaft 87 having keyed to its upper end a gear 89 which meshes with the teeth 11 of the turret 10. It follows from this that, at each engagement of the clutch member 60 with the clutch face of the gear 57, to drive the shaft 55 in one direction, the turret will be rotated.

A gear case 90 is located central of the housing 1, and is supported and spaced from the opposite sides of the housing by the arms 91, the arms and case being preferably formed integral with the housing. A shaft 92 is journaled within a boss 93 of the gear case, and is further supported by bearings 95 and 96 that are made a part of a brace 97 which bridges the upper end of the housing and has its ends secured to the inner side of the channel 3. A worm gear 98 is contained within the case 90 and is splined to the shaft 92, and this gear meshes with a worm 100, which occupies an off-set 101 of the case 90 and is keyed to the shaft 55, so that, as the shaft 55 is rotated in opposite directions through the clutch mechanism above described, the worm wheel, together with the shaft 92, will be oscillated, the angular movement of the shaft, through the proportion of the parts, being substantially 90°. The lower end of the shaft has a ball bearing support within a rider 104 that is equipped with a roller 105 which traverses a groove in a drum cam 106.

The drum cam 106, shown in detail in Figs. 16 and 17, is splined to a shaft 108 journaled at its opposite ends in bearings 109 that are secured within apertures in the wall of the housing. The rider 104 rotates within a bearing 110 which is supported central of the housing by arms 111, shown as formed integral with one side of the bearing 110; and within a lateral extension of this bearing is journaled the inner end of a short shaft 112 that has its opposite end journaled within the bearing 113 of a bracket 114 which is supported from the adjacent side of the housing. A bevel gear 115 is splined to the vertical shaft 92 and meshes with a bevel pinion 116 that is keyed to the shaft 112. A gear 118 is also secured to the shaft 112 adjacent the pinion 116 and meshes with a gear 119 that is fastened to the shaft 108. Consequently, as the shaft 92 is oscillated, its motion is transmitted through the gearing just described to the shaft 108 and drum cam 106, the gear ratio being such that the cam drum is rotated in opposite directions through nearly 360°.

I have already explained how the turret is intermittently moved (each movement extending through 90°), and it may be temporarily locked during the interim between its movements by a plunger 120 that is guided at its upper end within a hollow cylindrical boss 121 formed in the bottom of the channel 3, the plunger having a socket at its lower end which receives the upper end of a rod 122 that is guided within a bracket 123 secured to the side of the housing. A yielding connection is provided between the plunger 120 and rod 122 by a spring 125 that is confined between the lower end of the plunger and a nut 126 adjustable along the rod, the separation of the rod and plunger being limited by a pin 127 which extends through a slot in the lower end of the plunger. The rod is held against rotation within the bracket 123 by a set screw 128 that is threaded through the wall of the bracket 123 and enters a longitudinal groove in the rod. This is for the purpose of maintaining a roller 130 carried by the lower end of the rod in proper relation to a cam 131 which is fastened to a shaft 108. It may be explained that when the clutch 60 is thrown in a direction to operate the turret driving gears, the cam 131 is moved into a position to permit the plunger 120 to withdraw from one of the recesses 133 that is formed in the bottom of the turret; and as the turret approaches its period of rest, the cam 131 is moved to elevate the plunger into contact with the bottom of the turret so that when a recess is brought into register with the plunger, the plunger is projected into the recess by the spring 125. Thus the turret is positively held against movement with the chucks in proper relation to the various tools.

An arm 135 located between bearings 95 and 96, is clamped to the vertical shaft 92 by split collars 136 that are threaded upon the shaft. The arm has an extension 137 which projects into the bifurcated end 138 of a shifting fork 140, a yielding connection being provided between the end of the extension 137 and the lower jaw of the bifurcated end 138 through a spring pressed plunger 141. The shifting fork 140 embraces a shifting collar 142 on the clutch 60, and the trunnions of the collar extend into slots 143 in the branches of the fork. The fork is fulcrumed upon a pintle 144 that is supported within a bracket 145 projecting inward from the inner side of the channel 3.

The nature of the previously mentioned drum cam 106 (as will be seen from the perspective view of the cam in Fig. 16) is such as will cause a reciprocation of the shaft upon each oscillation of the cam, the rider 104 traversing one branch of the cam groove when the cam rotates in one direction, and the other branch when the cam is reversed. As the vertical shaft is moved upward and carries with it the arm 135, the extension 137 will rock the fork 140 in a direction to move the clutch member 60 into engagement with the clutch face of the gear 63 and rotate the shaft 55 in one direction. This will continue until the rider 104 is lowered to permit the shaft 92 to drop when the fork 140 will be thrown in the opposite direction to move the clutch member 60 into engagement with the clutch face of the gear 57, when the rotation of shaft 55 will be reversed.

I shall now describe the mechanisms that are located at the respective stations B, C, and D. Rising from the inner side of the channel 3, at station B, is a bracket 150 that has a horizontal cylindrical boss 151 at its upper end within which is journaled a spindle 152, the boss being divided near its middle for the accommodation of a sprocket wheel 153 that is splined to the spindle. At its forward end the spindle is provided with a tool chuck 154, which may be of any approved type, and within which is clamped the shank of a drill 155. The sprocket 153 is driven, through a chain 157, from a sprocket wheel 160 on the main shaft 51, the chain being guided over an idler 161 loose upon the shaft 75, to avoid interference of the chain with the clutch member 60.

A plate 163, having an aperture at its center which is adapted to be placed over the drill 155 so that the plate may engage the chuck 154, has flexible members 165 such as light weight cables, attached to its ends, the flexible members or cables extending rearwardly over sheaves 166 that are supported upon opposite sides of the rear portion of the boss 151, the flexible members or cables having a weight 167 attached to their lower ends which tends to draw the spindle inwardly.

The rear end of the spindle contains a ball, or other anti-friction device 168 which is adapted to ride the periphery of a cam 170 that is secured to the upper end of the vertical shaft 92, the cam being shown as resting upon a flange 171 of the shaft and held thereagainst by a nut 172 that is threaded upon the reduced end of the shaft. Only approximately 90° of the periphery of the cam 170 is arranged to coöperate with the anti-friction device of the spindle 152, such portion being designated 174. As the cam is rotated to the right, as viewed in Fig. 1, it will advance the spindle, and consequently the drill 155, forwardly to bore the shank of a yoke Y that is carried by the chuck then located in front of the drill.

A bracket 178 rises from the inner wall of the channel 3 at station C and has a cylindrical boss 179 at its upper end within which a plunger 180 is reciprocable, the rear end of the plunger being provided with an antifriction roller 181 which is adapted to be engaged by a portion 182, of the cam 170, such portion being inclined so as to move the plunger outward as the cam rotates toward the right. A spring 183, which has one of its ends anchored upon a post 184 rising from the boss 179 and its opposite end fastened to a pin 185 which is attached to a head 186 that is applied to the forward end of the plunger, tends to retract the plunger and hold its roller 181 in engagement with the cam. The head 186 engages the rear side of a chuck located at station C to move the chuck outwardly across the turret.

Supported vertically within bearings 190 (see Figs. 4 and 10) which extend rearwardly from the housing of the machine is a shaft 191 which has secured to it above the plane of the turret a series of cutters 192 that are situated so as to finish the circular sides of the bosses of the yoke carried by the adjacent chuck as it is moved forward by the plunger 180. The upper end of the shaft 190 is journaled within a block 193 which has an adjustable dovetail connection with a riser 194 extending upward from the housing. A bevel pinion 195 is secured to the lower end of the cutter shaft 191 and meshes with a similar pinion 196 that is fastened to the outer end of a shaft 197. This shaft is journaled within a bearing 198 that extends inward from the rear side of the housing, and has a bevel pinion 199 secured to its inner end which is driven, by a similar pinion 200 that is fastened to the shaft 75. The shaft 75 has a pinion 201 keyed or otherwise secured to it which meshes with gear 57, so that the shaft 75 is constantly driven in one direction.

At station D a bracket 205 rises from the inner side of the channel 3, this bracket being quite similar to the one located diametrically opposite. The bracket 205 has a cylindrical boss 206 at its upper end within which a spindle 207 is slidably mounted and the boss is divided at about its longitudinal center to accommodate two pulleys 208 and 209 that are splined to the spindle, the spindle having a chuck 210 at its outer end within which a tap 211 is supported for threading the bore in the shank of the yoke that is clamped in the adjacent chuck or work holder. A plate 212 is perforated at its center so that it may be passed over the tap and brought to bear upon the face of the chuck 210, the ends of the plate having flexible members or cables 214 secured to its opposite ends which pass rearwardly over sheaves 215, the flexible members having connected to their depending ends a weight 216 which tends to draw the spindle inwardly to bring its inner end 217 into engagement with the adjacent peripheral portion 218 of the cam 170. The last mentioned portion of the cam is of such shape as to accomplish an advanced and retracted movement of the tap 211 during a quarter turn of the cam.

A spindle 220 is reciprocably supported in the upper end of a bracket 221 which is secured to and rises from the outer side of the trough 6 adjacent the tapping mechanism just described; and the spindle 220 has a chuck 223 at its lower end within which is clamped the shank of a drill 224, the drill being supported near its lower end by a guide 225 that extends outward from an adjacent part of the bracket 221. The drill is thus supported in a position to bore the cylindrical bosses of the yoke that is clamped within the adjacent chuck.

I provide for a slight lateral adjustment of the spindle 220 by making the apertures of the bracket 221 through which the spindle extends somewhat greater in size than the diameter of the spindle, and by journaling the spindle in a block 226 guided between side flanges 221ª of the bracket, and which is adapted to be moved inwardly and outwardly and held in any adjusted position by screw 227 that is shown as threaded in the block and swiveled in the bracket. Guide 225, it will be observed, is slotted to receive its attaching bolts or screws to provide a corresponding adjustment.

A pulley 228 is splined to the spindle 220 within the head of the bracket 221 and is driven, through a belt 229, from a pulley 230 that is carried by the upper end of a shaft 231 supported within brackets 232 that extend from the housing in the vertical plane of the main drive shaft 51. The shaft 231 has a bevel pinion 235 secured to its lower end which meshes with a bevel pinion 236 that is fastened to the right hand end of the main shaft so that the drill 224 is constantly driven from the main shaft through the transmission mechanism just described. An arm 240 extends to the rear and upward from the upper end of the bracket 221 and has pivoted to its outer end a lever 242. This lever is forked at its forward end to embrace a shifting collar 243 to which it is pivoted, and the collar is rotatably mounted upon the upper end of the spindle 220 and the rear end of the lever is connected through an adjustable link 244, with the outer end of the previously mentioned arm 135, so that upon the reciprocation of the shaft 92 which carries the arm, the drill 224 will be moved vertically.

I have mentioned the fact that pulleys 208 and 209 are splined to the tap spindle 207, and I shall now explain how these pulleys are driven alternately in opposite directions to drive the tap on its cutting expedition and then reverse its direction of rotation to withdraw it. On the right hand end of the shaft 55 there is loosely mounted a gear 250 which has keyed to the inner end of its sleeved hub a pulley 251 located substantially in the vertical plane of the pulley 208. (See Fig. 3). Another gear 252 is loosely mounted upon the hub of the gear 250 and has a pulley 253 formed integral with it and which is in substantially the vertical plane of the pulley 209. The gear 250 is driven through an idler 254 from a gear 255 that is keyed to the main drive shaft (see Fig. 11); and the gear 252 meshes directly with a gear 256 that is keyed to the main drive shaft adjacent the gear 255. Thus the gears 250 and 252 are rotated in opposite directions. A belt 257 is shiftable back and forth from the pair of pulleys 208 and 251, to the pair 209 and 253 by automatic shifting mechanism which will now be described with special reference to Figs. 2 and 18.

The gear case 90 which contains the worm wheel 98 is closed at its upper end by a cover plate 258 and the cover plate has a segmental opening within which travels a support 260 rising from the worm wheel. To the radial sides of the support are attached wings 261 which overlie the cover plate 158 and close, at all times, the aforesaid segmental opening. A plate 263 is adjustable upon the support 260 and has a finger 264 extending toward the periphery of the worm wheel. A belt shifting fork 265 is pivoted at 266 to an adjacent part of the case 90 and its inner end has pivoted to it a dog 268 that is adapted to be engaged by the finger 264. This dog is L-shaped, and the branch, other than the one engaged by the finger 264, has a roller 270 which rides within a groove 271 formed in a plate 272 that is stationary and supported by the gear case 90. The groove 271 has lateral offsets in opposite directions that are spaced a distance apart equal to that through which the adjacent end of the belt shifter is adapted to be moved; and within each of the offsets there is a spring pressed plunger which is normally extended substantially flush with the adjacent side of the groove. The action of the belt shifter is thus: As the worm wheel rotates to the left (as viewed in Fig. 3), the finger 264 engages the dog 268 and moves it and the attached end of the belt shifter in a corresponding direction until the roller 270 of the dog engages and depresses the appropriate plunger, allowing the dog to rock upon its pivot and out of the path of the finger 264. The belt shifter accordingly acts to shift the belt 257 from pulleys 208 and 251, to pulleys 209 and 253, reversing the direction of rotation of the spindle 207 and tap 211, before the finger 264 escapes the dog 268. When the direction of the worm wheel is reversed the finger engages the opposite side of the dog and returns the belt to its former position through the consequential rocking of the shifting lever, the swinging of the lever continuing until the roller of the dog is permitted to depress the other spring pressed plunger and withdraw from the path of the finger 264.

From the foregoing description it is obvious that the central shaft 92 is rotated in reverse directions according to the condition of the clutch member 60 which is automatically shifted from one effective position to the other by means of the spring 66 and extension 137 of the arm 135; and that the shaft is reciprocated vertically through the action of the drum cam 106. During the cutting operation of the drill 155; during the advancing of the chuck toward the cutters by means of the plungers 180, and during the projection and retraction of the tap 211, the cam 170 is in engagement with the respective cam engaging parts of these various mechanisms; but as soon as their respective cutting operations are completed, the cam drops below the plane of the antifriction devices, releasing them, allowing the immediate drawing back of the spindles 152 and 207 by their respective weights, and the retraction of the plunger 180 by its spring 183. The cam is returned to its former angular position by the reversal of the shaft 92 while the cam is below the plane of the anti-friction devices, and when the shaft is subsequently raised, the cam is in a position to again execute the outward movement of the various devices.

An oil pump 280 is located within the basin 8 and is driven by a belt 281 from a pulley 282 on the main drive shaft, and operates to elevate a cutting or lubricating solution from the basin through the pipe 283 to a distributing pipe 284 which has branches for delivering the lubricant to the various tools.

Any chips which accumulate upon the turret to the rear of the chucks, through the drilling operation at station B, are forced from the turret by the backward movement of the chuck, as it is engaged and shifted inward by the cam 40, and into a chute 286 which descends from the inner side of the channel 3 which deposits the chips outside the rear of the machine housing.

The modification of the invention illustrated in Figs. 18 to 22 differs from the foregoing embodiment principally in providing an actuating member for creating relative movement between the tools and work holders that is driven continually in one direction and operated constantly in one plane; and this change obviously simplifies the structure very materially for it obviates the need of oscillating and reciprocating the central vertical shaft which carries the actuating member.

So far as possible I have retained the general construction of the former embodiment, and a repetition of the description of the generalities of the machine is therefore deemed unnecessary at this time. Like reference characters are used to designate the corresponding parts of the two forms of the invention.

In the present case, 300 represents the main driving shaft which is equipped with the pulley 301. A pinion 302, secured to the driving shaft 300, meshes with a gear 303, fixed to a shaft 304 that is supported in suitable bearings that are sustained by the housing 1. The shaft 304 has secured to it a worm 305 which meshes with a worm wheel 306 keyed to the central vertical shaft 307. This shaft is supported in a manner similar to that in which the corresponding shaft 92 is supported in the previous embodiment of the invention, except in the present case it is held against reciprocation. A cam shaft 310 extends transversely of the housing 1 and is supported in suitable bearings directly beneath the lower end of the vertical shaft 307 and is driven therefrom through the miter gears 312 and 314 which are carried, respectively, by the shafts 307 and 310.

The turret 10 is driven, as in the first case, through pinion 89 keyed to the upper end of the shaft 87 supported within brackets 88 extending rearwardly from the housing 1. The shaft 87, in the present case, has a bevel gear 315 secured to its lower end, and this gear meshes with a similar pinion 316 that is fastened to the right hand end (as viewed from the front of the machine) of a sleeve 317, mounted on a shaft 318, supported in a horizontal position by brackets 319, carried by the rear of the housing 1. The end of the sleeve 317 opposite the pinion 316 has fastened to it a clutch member 320 for coöperation with a clutch member 321 that is splined to the shaft 318. The clutch member is reciprocated upon the shaft by a cam 322 (carried by the previously mentioned cam shaft 310) through the intervention of a lever 323 pivoted at 324 to a bracket 325. This lever has its outer end forked to engage within the groove 326 of the clutch member 321, and its opposite end is provided with a roller 327 which traverses the groove 328 of the cam 322. The groove of the cam is so shaped as to engage the clutch member 321 with the member 320, and thus move the turret, twice upon each rotation of the cam, and also to permit a dwell of the turret intermediate its movements of sufficient duration to allow for the operation of the tools. The shaft 318 receives its power from the main driving shaft 300 through a gear 330, secured to its left hand end, and meshing with the gear 302 of the shaft 300.

A bevel pinion 332 is secured to the shaft 318 beyond the right hand end of the sleeve 317, and is the equivalent of the gear 196 of the previous form. This gear 332 coöperates with the gear 195 on the lower end of the cutter shaft 191, which shaft carries the cutters 192 at its upper end.

The mechanism for driving the tap 211 in reverse directions is substantially identical in both forms of invention except for the means for shifting the belt 208. In the present case, the belt 208 is embraced by a fork 335 formed on the end of a lever 336 that is pivoted at 337 to a bracket extending from the casing of the worm gear 306, and the end of the lever opposite the fork is shown as having a roller 338 which traverses the groove 339 of a cam 340 carried by the cam shaft 310.

A further distinction between the present and former embodiments of the invention is the means for reciprocating the spindle 220 of the vertical drill 224. Here, the lower end of the adjustable link 284 is guided by a suitable bracket 341 carried by the housing 1 and shown in dotted lines in Fig. 21, and the link is shown as having a roller 342 which bears upon a cam 343 secured to the right hand end of the cam shaft 310 which protrudes beyond the housing 1.

The cam shaft is further provided with a cam 345 which is the equivalent of the cam 131 of the earlier form of the invention.

Relative movement is created between the various tools and work holders through the intervention of slides 350, an example of which is found illustrated in detail in Fig. 21, where it is associated with the pusher for advancing the work holder toward the cutter 192, and in Fig. 22, where it is shown in transverse section. Each slide is equipped with a cam engaging element or part 351 which is in a different plane from that of the corresponding elements or parts of the other slides. The central vertical shaft 307 has secured to its upper end an individual cam 352 in the respective plane of and for the coöperation with each of the cam engaging elements or parts 351. Accordingly as the cams (which constitute a common actuating device for all of the slides 350) are rotated in one direction—to the right, in the present instance—the slides are actuated to create a relative movement between the respective tools and the work holders associated therewith. As shown particularly in Fig. 19, each cam 352 is double, so that an outward movement of its corresponding slide 350 will take place upon each half rotation of the shaft 307. I consider these proportions unessential, however, for it is obvious that the number of movements of these slides may be made more or less with respect to a rotation of the shaft 307 without deviating from the purpose of the invention.

Having thus described my invention, what I claim is:—

1. In a machine of the character set forth, the combination of a tool, mechanism for operating the tool, a work holder, an actuating member which, when moved in one direction and in a given plane will create relative movement between the tool and work holder, and means for moving said member in reverse directions in different planes.

2. In a machine of the character set forth, the combination of a tool, mechanism for operating the tool, a work holder, an actuating member means through which said member when moved in one direction and in a given plane will create relative movement between the tool and work holder, and mechanism for moving said member in reverse directions in different planes.

3. In a machine of the character set forth, the combination of a tool, mechanism for operating the tool, a work holder, an actuating member, mechanism for oscillating said member, means through which said member when moved in one direction and in a given plane will create relative movement between the tool and work holder, and means for removing said member from said plane during its movement in the opposite direction.

4. In a machine of the character set forth, the combination of a tool, mechanism for operating said tool, a work holder, an actuating member, mechanism for moving said member, means adapted to be engaged by said member for creating relative movement between the tool and work holder, and means for alternately moving said member into and out of the plane of the former means.

5. In a machine of the character set forth, the combination of a tool, mechanism for operating said tool, a work holder, an actuating member, means adapted to be engaged and moved by said member when in a given plane for presenting the tool in operative relation to work supported by said holder, means tending to retract the tool, and mechanism for moving the actuating member in reverse directions in different planes.

6. In a machine of the character set forth, the combination of a series of tools, a turret movable with respect thereto, a plurality of work holders carried by the turret, operating mechanism for the tools, a member movable in a given plane and in one direction for moving the tools and work holders into operative relation, means for moving said member in reverse directions, and further means for removing the member from the aforesaid plane while said member is being moved in a direction opposite to that aforesaid.

7. In a machine of the character set forth, the combination of a series of tool carrying spindles, means within which each spindle is rotatably and reciprocably supported, means for rotating the spindles, a plurality of work holders, mechanism for automatically moving the work holders successively into operative relation to the spindles and temporarily locking them in such condition, and means incorporating an individual cam part for advancing each spindle toward the work.

8. In a machine of the character set forth, the combination of a series of tool carrying spindles, means within which each spindle is rotatably and reciprocably supported, means for rotating the spindles, a plurality of work holders, mechanism for automatically moving the work holders successively into operative relation to the spindles and temporarily locking them in such condition, means incorporating an individual cam part for advancing each spindle toward the work, and means tending to retract the spindles.

9. In a machine of the character set forth, the combination of a central actuating member, work holders movable about an orbit surrounding the actuating member, tools supported intermediate the actuating member and work holders and arranged to be moved by the member into operative relation to work supported by said holders, and means for driving the tools.

10. In a machine of the character set forth, the combination of a series of supports, tool holders reciprocable within said supports, a turret movable past said supports, work holders shiftable across the turret toward and from the tools, cams stationarily supported adjacent the turret and arranged to be engaged by the work holders to shift said work holders across the turret, an actuating member arranged to move said tool holders into operative relation to the work holders, means for driving said member, and mechanism for driving the tools.

11. In a machine of the character set forth, the combination of a central actuating member having cam portions, means for oscillating said member, means for moving said member from one plane to another, work holders movable about an orbit surrounding the actuating member, tools supported intermediate the actuating member and work holders and arranged to be moved by the cam portions thereof into operative relation to work supported by the holders, and means for driving the tools.

12. In a machine of the character set forth, the combination of a central actuating member having cam portions, means for moving said member alternately from one plane to another, means for rotating said member in opposite directions in the respective planes, work holders movable about an orbit surrounding the actuating member, tools supported intermediate the actuating member and work holders and arranged to be moved by the cam portions of said member into operative relation to work supported by the holders, means for retracting the tools, and mechanism for driving tools.

13. In a machine of the character set forth, the combination of a series of tools, operating mechanism for the tools, a plurality of work holders, a turret supporting said work holders, a driving shaft, a driven shaft, driving connections between said shafts, reversing means in said connections, driving mechanism for the turret which is rendered effective by the reversing means when in one position, an actuating member, driving connection between said member and the driven shaft wherefore said member is oscillated, means for alternately moving said member from one plane to another, means adapted to be engaged by the actuating member when in one plane for creating relative movement between the tools and work holders, and connections through which the aforesaid reversing means is shifted according to the shifting of said member from one plane to another.

14. In a machine of the character set forth, the combination of a central vertical shaft, an actuating member carried thereby, tool carrying spindles, means rotatably and reciprocably supporting said spindles, the actuating member having cam portions for coöperation with the spindles, a turret substantially concentric to the vertical shaft, work holders supported by the turret, a driving shaft, a driven shaft, reversible connections between the driving and driven shafts, operative connections between the driven shaft and the vertical shaft, a cam whereon the vertical shaft is supported, means for operating said cam to reciprocate the vertical shaft and thereby move the aforesaid actuating member into and out of the plane of the tool carrying spindles, means actuated by the vertical shaft as the same is reciprocated for reversing the aforesaid reversible connections, means for driving the turret which is rendered effective when the reversible connections are shifted in one direction, and means for driving the tool carrying spindles.

15. In a machine of the character set forth, the combination of a central vertical shaft, an actuating member carried thereby, tool carrying spindles, means rotatably and reciprocably supporting said spindles, the actuating member having cam portions for coöperation with the spindles, a turret substantially concentric to the vertical shaft, work holders supported by the turret, a driving shaft, a driven shaft, reversible connections between the driving and driven shafts, operative connections between the driven shaft and the vertical shaft, a cam whereon the vertical shaft is supported, means for operating said cam to reciprocate the vertical shaft and thereby move the aforesaid actuating member into aud out of the plane of the tool carrying spindles, means actuated by the vertical shaft as the same is reciprocated for reversing the aforesaid reversible connections, means for driving the turret which is rendered effective when the reversible connections are shifted in one direction, turret locking means rendered effective when said connections are shifted in the opposite direction, and means for driving the tool carrying spindles.

16. In a machine of the character set forth, the combination of a central vertical shaft, an actuating member carried thereby, tool carrying spindles, means rotatably and reciprocably supporting said spindles, the actuating member having cam portions for coöperation with said spindles, a turret substantially concentric to the vertical shaft, work holders supported by the turret, a driving shaft, a driven shaft, reversible connections between said shafts, operative connections between the driven and vertical shafts, means for reciprocating the vertical shaft thereby to move the actuating member alternately into and out of the plane of the spindles, means actuated by the vertical shaft as the same is reciprocated for reversing the aforesaid reversible connections, means for driving the turret that is rendered effective when the reversible connections are shifted in one direction, and means for driving the tool carrying spindle.

17. In a machine of the character set forth, the combination of a series of tools, a plurality of work holders, a turret supporting said work holders, a driving shaft, a driven shaft, reversible driving connections between the driving and driven shafts and involving a clutch through which said connections are reversed, driving mechanism for the turret which is rendered effective when the clutch is in a position to drive the driven shaft in one direction, a vertical shaft, an actuating member carried by the vertical shaft, means arranged to be engaged by the actuating member for creating relative movement between the tools and work holders, a cam whereby the vertical shaft is reciprocated to move the actuating member alternately into and out of the path of said means, driving means for the vertical shaft and the cam whereby said vertical shaft is reciprocated, connections between the clutch and vertical shaft whereby the reciprocation of the vertical shaft will shift the clutch, and mechanism for driving the various tools.

18. In a machine of the character set forth, the combination of a series of supports, tool holders reciprocable within said supports, a turret movable past said supports, work holders shiftable across the turret toward and from the tools, cams stationarily supported adjacent the turret and arranged to be engaged by the work holders to shift said work holders across the turret, an actuating member adapted, when in a given plane, to move said tool holders into operative relation to the work holders, means for driving said member, mechanism for driving the tools, and means for moving said member alternately into and out of the plane of the tool holders.

19. In a machine of the character set forth, the combination of a revolubly supported tool carrier, a work holder, mechanism for alternately rotating the tool carrier in reverse directions, means for initiating a relative movement of the tool carrier and work holder toward each other, and mechanism for operating the last mentioned means.

20. In a machine of the character set forth, the combination of a support, a tool carrying spindle, revoluble and reciprocable within said support, a work holder sustained in operative relation to the spindle, a pulley on said spindle, a pair of pulleys, means for driving the pulleys of said pair in opposite directions, a belt engaged over the pulley of the spindle and adapted to be shifted from one to other of the pair of pulleys, a belt shifter, means for initiating a relative movement of the spindle and work holder toward each other, and mechanism for operating the last mentioned means and actuating the belt shifter in a given sequence.

21. In a machine of the character set forth, the combination of a pair of tools, a holder for supporting a piece of work in a position to be operated on by both tools, driving means for the tools, an actuating member operative, when in a given plane, to advance one tool toward the work, means for operating said member, means for moving said member alternately into and out of said given plane, and connections through which such movement of the actuating member moves the other tool.

22. In a machine of the character set forth, the combination of a tool, means for operating the tool, a work holder, a carrier for the work holder movable past the tool, means for moving the carrier, means arresting the movement of the carrier when the work holder is in operative relation to the tool, and an actuating device for advancing the work holder toward the tool.

23. In a machine of the character set forth, the combination of a tool, means for operating the tool, a work holder, a carrier for the work holder movable past the tool, means for moving the carrier, means arresting the movement of the carrier when the work holder is in operative relation to the tool, an actuating device for advancing the work holder toward the tool, and means for retracting the work holder as the carrier resumes its movement.

24. In a machine of the character set forth, the combination of a central actuating member, a tool, work holders movable about an orbit surrounding the actuating member and intermediate the member and tool and arranged to be moved by the member into operative relation to the tool, and means for driving the tool.

25. In a machine of the character set forth, the combination of a turret adapted to support a piece of work between its periphery and axis of rotation, a vertically disposed tool supported from beyond the periphery of the turret and arranged to operate upon the work, and an actuating member located at said axis for operating the tool.

26. In a machine of the character set forth, the combination of a turret adapted to support a piece of work between its periphery and axis of rotation, a vertically disposed tool supported from beyond the periphery of the turret and arranged to operate upon the work, a tool situated between the work, for operation thereon, and the rotating axis of the turret, and an actuating member located at said axis for operating both tools.

27. In a machine of the character set forth, the combination of a tool, means for operating the tool, a work holder, a carrier for the work holder movable past the tool, means for moving the carrier, means arresting the movement of the carrier when the work holder is in operative relation to the tool, and an actuating device for advancing the work holder toward the tool.

28. In a machine of the character set forth, the combination of an actuating member, a tool, work holders movable about an orbit and transversely of the orbital path between the member and tool and arranged to be moved transversely of the orbital path by the member into operative relation to the tool, and means for driving the tool.

29. In a machine of the character set forth, the combination of a turret adapted to movably support a piece of work, tools supported at stations spaced apart circumferentially of the turret and from beyond the periphery thereof, an actuating member located at substantially the axis of rotation of the turret, operative connections between said member and one of said tools for moving the tool toward the work, and means whereby the actuating member moves the work toward the other tool.

In testimony whereof, I hereunto affix my signature.

NATHAN F. FRETTER.